(12) United States Patent
Hart et al.

(10) Patent No.: US 8,923,187 B2
(45) Date of Patent: Dec. 30, 2014

(54) WIRELESS COMMUNICATION SYSTEMS

(75) Inventors: Michael John Beems Hart, London (GB); Yuefeng Zhou, Haywards Heath (GB)

(73) Assignee: Fujitsu Limited, Kawasaki-shi (JP)

( * ) Notice: Subject to any disclaimer, the term of this patent is extended or adjusted under 35 U.S.C. 154(b) by 297 days.

(21) Appl. No.: 13/099,513

(22) Filed: May 3, 2011

(65) Prior Publication Data

US 2011/0206027 A1    Aug. 25, 2011

Related U.S. Application Data

(63) Continuation of application No. 11/856,145, filed on Sep. 17, 2007, now Pat. No. 8,045,496.

(30) Foreign Application Priority Data

Oct. 13, 2006    (GB) .................................... 0620373.1

(51) Int. Cl.
| | | |
|---|---|---|
| *H04B 7/14* | (2006.01) | |
| *H04W 28/06* | (2009.01) | |
| *H04B 7/155* | (2006.01) | |
| *H04B 7/26* | (2006.01) | |
| *H04L 1/00* | (2006.01) | |
| *H04W 16/26* | (2009.01) | |
| *H04W 28/04* | (2009.01) | |
| *H04W 84/04* | (2009.01) | |

(52) U.S. Cl.
CPC ............. *H04W 28/065* (2013.01); *H04B 7/155* (2013.01); *H04B 7/2606* (2013.01); *H04L 1/0045* (2013.01); *H04L 1/0072* (2013.01); *H04L 2001/0097* (2013.01); *H04W 16/26* (2013.01); *H04W 28/04* (2013.01); *H04W 84/047* (2013.01)
USPC ............................... 370/315; 370/328; 455/7

(58) Field of Classification Search
USPC ......... 370/229, 235, 310, 315, 328, 329, 335, 370/345, 347, 348; 455/7, 11.1, 16, 24
See application file for complete search history.

(56) References Cited

U.S. PATENT DOCUMENTS

| | | | |
|---|---|---|---|
| 5,719,868 A | | 2/1998 | Young |
| 5,942,002 A | * | 8/1999 | Brandin ........................ 714/757 |

(Continued)

FOREIGN PATENT DOCUMENTS

| | | |
|---|---|---|
| EP | 0 151 280 | 12/1984 |
| EP | 1 617 693 | 1/2006 |

(Continued)

OTHER PUBLICATIONS

Extended European Search Report; Application No. 07113482.9-1249 / 1912452; pp. 6, Oct. 9, 2012.

(Continued)

*Primary Examiner* — Chi H Pham
*Assistant Examiner* — Weibin Huang
(74) *Attorney, Agent, or Firm* — Baker Botts L.L.P.

(57) ABSTRACT

A wireless communication method in a system in which subscriber stations are each operable for communication with a base station is provided. The base station is capable of performing simultaneous communications with a plurality of the subscriber stations simultaneously by exchange of packets each conforming with a layered protocol of said system. The packets include a first portion for defining physical layer (PHY) parameters and a second portion for defining media access layer (MAC) parameters. Furthermore, communications between the subscriber stations and the base station are performed wholly or partly through at least one relay station. In this system, the method includes, in the relay station, receiving a plurality of packets from the subscriber stations, detecting the second portion of each of the packets, combining the detected second portions to form a second portion of at least one new packet, and transmitting the new packet to the base station.

7 Claims, 8 Drawing Sheets

(56) References Cited

U.S. PATENT DOCUMENTS

| | | | |
|---|---|---|---|
| 6,370,384 | B1 | 4/2002 | Komara |
| 6,377,782 | B1* | 4/2002 | Bishop et al. ............... 455/3.01 |
| 6,701,129 | B1 | 3/2004 | Hashem et al. |
| 6,990,121 | B1 | 1/2006 | Stiles et al. |
| 7,096,274 | B1 | 8/2006 | Ci et al. |
| 8,045,496 | B2* | 10/2011 | Hart et al. ................... 370/315 |
| 2002/0080816 | A1 | 6/2002 | Spinar et al. |
| 2003/0054771 | A1 | 3/2003 | Chappaz |
| 2004/0005861 | A1 | 1/2004 | Tauchi |
| 2004/0062214 | A1 | 4/2004 | Schnack et al. |
| 2004/0100929 | A1 | 5/2004 | Garcia-Luna-Aceves |
| 2004/0109428 | A1 | 6/2004 | Krishnamurthy |
| 2005/0030887 | A1 | 2/2005 | Jacobsen et al. |
| 2005/0048914 | A1 | 3/2005 | Sartori et al. |
| 2005/0201383 | A1* | 9/2005 | Bhandari et al. ......... 370/395.42 |
| 2006/0023745 | A1 | 2/2006 | Koo et al. |
| 2006/0153132 | A1 | 7/2006 | Saito |
| 2006/0256741 | A1 | 11/2006 | Nozaki |
| 2006/0264172 | A1 | 11/2006 | Izumikawa et al. |
| 2007/0072604 | A1* | 3/2007 | Wang ........................... 455/428 |

FOREIGN PATENT DOCUMENTS

| | | | |
|---|---|---|---|
| EP | 1 635 592 | 3/2006 | |
| EP | 1 677 443 | 7/2006 | |
| EP | 1 804 430 A1 | 7/2007 | |
| JP | 2006/196985 | 7/2006 | ............... H04L 12/28 |
| JP | 2007312244 | 11/2007 | ............... H04B 7/15 |
| WO | WO 99/44341 | 9/1999 | |
| WO | WO 01/76289 | 10/2001 | |
| WO | WO 03/058984 | 7/2003 | |
| WO | WO 2004/056013 | 7/2004 | |
| WO | WO 2004/107693 | 12/2004 | |
| WO | WO 2005/039127 | 4/2005 | ............... H04L 12/56 |
| WO | WO 2005/067173 | 7/2005 | |
| WO | WO 2006/012554 | 2/2006 | |
| WO | WO 2006/027964 | 3/2006 | ............... H04L 12/28 |
| WO | WO 2006/065069 | 6/2006 | |
| WO | WO 2006/098608 | 9/2006 | |
| WO | WO 2006/120161 | 11/2006 | |

OTHER PUBLICATIONS

Japanese Office Action and English Translation; Application No. 2007-264880; pp. 7, Nov. 15, 2011.
Yasuyuki Nishibayashi et al.; "Proposal of MAC Frame Aggregation using Selective Repeat Retransmission in Wireless LANs"; IEICE technical report, vol. 104, Issue 438; pp. 31-36, Nov. 12, 2004.
Koji Tsubouchi et al.; "Packet Multiplexing Scheme on the Waiting Time in MAC Layer for Multihop Wireless Networks"; IEICE technical report; vol. 105, Issue 628; pp. 371-376, Feb. 23, 2006.
Communication from the European Patent Office, European Search Report for Application No. EP 07113557.8-1525, Dec. 3, 2007, 7 pages.
The Patent Office, Search Report under Section 17, U.K. Application No. GB0616482, date of search Oct. 27, 2006, 1 page.
The Patent Office, Search Report under Section 17, U.K. Application No. GB0616471, date of search Oct. 27, 2006, 1 page.
The Patent Office, Search Report under Section 17, U.K. Application No. GB0616477, date of search Oct. 27, 2006, 1 page.
The Patent Office, Search Report under Section 17, U.K. Application No. GB0616472, date of search Nov. 3, 2006, 1 page.
The Patent Office, Search Report under Section 17, U.K. Application No. 0616479, date of search Oct. 27, 2006, 1 page.
The Patent Office, Search Report under Section 17, U.K. Application No. 0622124, date of search Dec. 7, 2006, 1 page.
The Patent Office, Search Report under Section 17, U.K. Application No. 0622122, date of search Nov. 28, 2006, 1 page.
IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.
Hart et al., "Relay Midamble," IEEE 802.16 Broadband Wireless Access Working Group < http://ieee802.org/16>, pp. 0-3, Nov. 6, 2006.
Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.
Hart et al., >, "TDD MR Frame Structure," IEEE 802.16 Broadband Wireless Access Working Group < http://ieee802.org/16>, pp. 1-10, Oct. 20, 2006.
Hart, "Dimensioning and System Level Analysis of an HSDPA Network with Relaying Nodes," 5 pages, 2005.
Chu, "Polyphase Codes with Good Periodic Correlation Properties," IEEE Transactions on Information Theory, Jul. 1972, pp. 531-532.
Frank et al., "Phase Shift Pulse Codes with Good Periodic Correlation Properties," IRE Transactions on Information Theory, pp. 381-382, Oct. 1962.
Milewski, "Periodic Sequences with Optimal Properties for Channel Estimation and Fast Start-Up Equalization," IBM Research and Development Journal, pp. 426-431, Sep. 1983.
Hart, "Optimal Transmit Power Balancing in Multi-Hop Networks," Fujitsu Laboratories of Europe, Ltd., 6 pages, 2005.
Golay, "Multi-Slit Spectrometry," Journal of the Optical Society of America, vol. 39, No. 6, pp. 437-444, Jun. 1949.
Golay, "Complementary Series," IRE Transactions on Information Theory, IT 7, pp. 82-87, Apr. 1961.
Zhou et al., "Communication Systems," Pending U.S. Appl. No. 11/840,492, filed Aug. 17, 2007.
Zhou et al., "Communication Systems," Pending U.S. Appl. No. 11/840,518, filed Aug. 17, 2007.
Hart et al., "Communication Systems," Pending U.S. Appl. No. 11/840,546, filed Aug. 17, 2007.
Hart et al., "Communication Systems," Pending U.S. Appl. No. 11/840,570, filed Aug. 17, 2007.
Zhou et al., "Communication Systems," Pending U.S. Appl. No. 11/840,595, filed Aug. 17, 2007.
Hart et al., "Communication Systems," Pending U.S. Appl. No. 11/840,621, filed Aug. 17, 2007.
Hart et al., "Communication Systems," Pending U.S. Appl. No. 11/840,644, filed Aug. 17, 2007.
Hart et al., "Communication Systems," Pending U.S. Appl. No. 11/840,669, filed Aug. 17, 2007.
Hart et al., "Communication Systems," Pending U.S. Appl. No. 11/840,429, filed Sep. 7, 2007.
Hart et al., "Communication Systems," Pending U.S. Appl. No. 11/840,430, filed Sep. 7, 2007.
Hart et al., "Wireless Communication Systems," Pending U.S. Appl. No. 11/856,139, filed Sep. 17, 2007.
Hart et al., "Wireless Communication Systems," Pending U.S. Appl. No. 11/856,145, filed Sep. 17, 2007.
Hart et al., "Communication Systems," Pending U.S. Appl. No. 11/856,178, filed Sep. 17, 2007.
IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.
Hart et al., "Factors That Affect Performance of a Mobile Multihop Relay System," IEEE 802.16 Presentation Submission Template (Rev.8.3), Sep. 13, 2005, 19 pages.
Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.
Kim et al., Fair and Efficient Multihop Scheduling Algorithm for IEEE 802.16 BWA Systems, pp. 895-901, Oct. 3-7, 2005.
Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

(56) References Cited

OTHER PUBLICATIONS

Etri et al, Transmission of IP Packets over Ethernet over IEEE 802.16, draft-riegel-16ng-ip-over-eth-over-80216-01.txt, Oct. 1, 2006, pp. 1-16.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

Communication from the European Patent Office, European Search Report for Application No. EP 07 11 3538, Dec. 27, 2007, 7 pages.

Communication from the European Patent Office, European Search Report for Application No. EP 08 15 8421, Oct. 21, 2008, 1 pages.

Communication from the European Patent Office, European Search Report for Application No. EP 07 11 3481, Oct. 19, 2007, 1 pages, Oct. 21, 2008.

European Patent Office, European Search Report for Application No. EP 07 11 3483, Sep. 26, 2007, 6 pages.

European Patent Office, European Search Report for Application No. EP 08 15 5435, Aug. 1, 2008, 8 pages.

Japanese Office Action and English translation; Application No. 2013-37203; pp. 5, Dec. 10, 2013.

Extended European Search Report; Application No. 13188192.2-1857; pp. 8, Dec. 16, 2013.

\* cited by examiner

WIRELESS COMMUNICATION SYSTEMS

RELATED APPLICATION

The present application is a continuation application U.S. patent application Ser. No. 11/856,145 filed Sep. 17, 2007, which claims foreign priority benefits under 35 U.S.C. §119 of United Kingdom Application No. GB 0620373.1, filed on Oct. 13, 2006, entitled "Wireless Communication Systems."

TECHNICAL FIELD

This invention relates in general to wireless communication systems, and more particularly to a packet combination technique.

OVERVIEW

Recently, various standards have been developed for data communication over broadband wireless links One such standard is set out in the IEEE 802.16 specifications and is commonly known as WiMAX. The specifications include IEEE 802.16-2004, primarily intended for systems having fixed subscriber stations, and an enhanced specification IEEE 802.16e-2005 which among other things provides for mobile subscriber stations. In the following description, the term subscriber station (SS) applies to both fixed and mobile stations (SS/MS).

The entire content of IEEE Std 802.16-2004 "Air Interface for Fixed Broadband Wireless Access Systems" is hereby incorporated by reference. IEEE 802.16 envisages single-hop systems in which the subscriber station communicate directly with a base station within range, the range of a base station defining a "cell". By deploying multiple base stations at suitable positions within a given geographical area, a contiguous group of cells can be created to form a wide-area network. In this specification, the terms "network" and "system" will be used equivalently.

In systems of the above type, data is communicated by exchange of packets between the subscriber stations and base station whilst a connection (management connection or transport connection) is maintained between them. The direction of transmission of packets from the subscriber station to the base station is called the uplink, and the direction from the base station to the subscriber station is the downlink. The packets have a defined format which follows a layered protocol applied to the system and its component radio devices. Protocol layers relevant to packets as such are the so-called physical layer (PHY) and media access layer (MAC). In the IEEE 802.16-2004 specification, these protocol layers form a protocol "stack" as shown in FIG. 1. Incidentally, FIG. 1 also shows interfaces between protocol layers in the form of service access points (SAPs).

The media access layer is responsible for handling network access, bandwidth allocation, and maintaining connections. This includes controlling access of the base station (BS) and SSs to the network on the basis of "frames" which are divided into a number of slots. Data is exchanged between the MAC peer entities, in other words, between the subscriber station and base station, in units of a protocol data unit (PDU), the PDU being conveyed across the PHY layer using a number of slots. The MAC is divided into sublayers including a security sublayer (see FIG. 1) for allowing authentication, key exchange and encryption of PDUs.

Various physical layer implementations are possible in a IEEE 802.16 network, depending on the available frequency range and application; for example, both a time division duplex (TDD) mode—in which uplink and downlink transmissions are separated in time but may share the same frequency—and a frequency division duplex (FDD) mode—where uplink and downlink transmissions can occur at the same time but on different frequencies—are possible. The PHY layer also defines the transmission technique such as OFDM (orthogonal frequency division multiplexing) or OFDMA (orthogonal frequency division multiple access). A connection between a base station and subscriber station (more precisely, between MAC layers in those devices—so-called peer entities) is assigned a connection ID (CID) and the base station keeps track of CIDs for managing its active connections.

The concept of quality of service (QoS) is employed in wireless communication systems for allowing a wide range of services to be provided. During communication with a subscriber station, the base station allocates a QoS level depending on the type of service requested by the subscriber station and available bandwidth, bearing in mind that the base station typically will be communicating with several subscriber stations simultaneously. The QoS is allocated first during a network entry procedure at the time the subscriber station joins the network, and may be modified subsequently by the subscriber station making a request to the base station whilst the connection is maintained.

The relationship between QoS and CID/SFID is illustrated in FIG. 2. For ease of understanding FIG. 2, it is noted that "service flow" refers to transmission of data in a given direction (uplink or downlink) on a connection having a particular QoS. The QoS of the connection is defined by a service flow identifier (SFID) which has a one-to-one relationship to the connection ID. For example, the IEEE 802.16 specification provides four QoS classes or levels as follows:

(i) Unsolicited Grant Service (UGS):
This service supports real-time data streams consisting of fixed-size packets issued at periodic intervals, such as voice calls (VoIP).

(ii) Real-time Polling Service (rtPS):
This supports real-time data streams consisting of variable-sized packets issued at periodic intervals, such as MPEG video.

(iii) Non-real-time Polling Service (nrtPS):
A service level intended to support delay-tolerant data streams consisting of variable-sized packets for which a minimum transfer rate is needed, such as FTP (File Transfer Protocol).

(iv) Best Effort (BE)
This lowest service level is for data streams with no particular service requirements. Packets are handled as and when bandwidth is available.

However efficient the communication scheme employed in terms of use/re-use of available frequencies, since several subscriber stations typically access the same base station at the same time there is the possibility of "collision" between accesses from the subscriber stations. A contention-based scheme is therefore adopted in which the QoS is used to allocate bandwidth among the connected subscriber stations.

As already mentioned, packets involve both PHY and MAC protocol layers. More particularly, FIG. 3 shows a packet format having two parts, a PHY header and a MAC PDU. The MAC PDU in turn consists of a MAC header, an optional payload, and optional error correction code (cyclic redundancy code or CRC). The PHY header includes training sequences, frequency band allocation information, and other information relating to physical layer parameters. Within the MAC PDU, the MAC header normally gives essential parameters for media access, such as the type of PDU, MAC address, and type of MAC signaling etc. The CRC within MAC PDU is optional, and can be used to check the received MAC PDU. The payload within MAC PDU is also optional. For example, some controlling messages, such as a bandwidth request, or an ACK message, have no payload. The payload could be data from higher layer, or sub-MAC-header, which can give additional MAC information. To support addressing and QoS control, some wireless communication systems put connection identification (CID) into MAC header. For instance, in WiMAX, the service flow between SS/MS and BS can be created and activated during network entry procedure or by dynamic service flow procedure. As mentioned earlier, a service flow ID (SFID) will be assigned to each existing service flow, and each service flow is also associated to a specific QoS demand. A service flow has at least an SFID and an associated direction. The connection ID (CID) of the transport connection exists only when the service flow is admitted or active. The relationship between SFID and transport CID is unique, which means an SFID never be associated with more than one transport ID, and a transport CID shall never be associated with more than one SFID.

FIG. 4 shows a generic MAC header format as specified in IEEE 802.16-2004, including a 16-bit CID. In single hop wireless communication systems (e.g. IEEE 02.16-2004 and IEEE 802.16e-2005 as mentioned above), each subscriber station (SS or MS) can communicate with the BS directly. Recently, efforts are being made to extend IEEE 802.16 to multi-hop configurations in which traffic between BS and SS is routed via one or more relay stations (RS), rather than being transmitted directly. FIG. 5 shows an example of such a configuration having two relay stations labeled RS1# and RS2#. If the network is modified to support relaying functionality as shown in FIG. 5, normally, the relay station (RS) will relay all the packets from the radio devices (SSs or other RSs) within its coverage, to the BS.

The problem of this protocol is that the RS will also need to relay the PHY header in each instance, which may cost a lot of bandwidth between RS and BS. Especially, when several RSs are present, forming a chain of links between the BS and SSs, the PHY overhead between BS and its closest RS, such as RS 1# in FIG. 5, will accumulate, and more bandwidth will be used for PHY signaling overhead. This is a particular problem since typically bandwidth is more constrained on the uplink than on the downlink.

SUMMARY OF EXAMPLE EMBODIMENTS

In accordance with one embodiment of the present invention, a wireless communication method in a system in which subscriber stations are each operable for communication with a base station is provided. The base station is capable of performing simultaneous communications with a plurality of the subscriber stations simultaneously by exchange of packets each conforming with a layered protocol of said system. The packets include a first portion for defining physical layer (PHY) parameters and a second portion for defining media access layer (MAC) parameters. Furthermore, communications between the subscriber stations and the base station are performed wholly or partly through at least one relay station. In this system, the method includes, in the relay station, receiving a plurality of packets from the subscriber stations, detecting the second portion of each of the packets, combining the detected second portions to form a second portion of at least one new packet, and transmitting the new packet to the base station.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
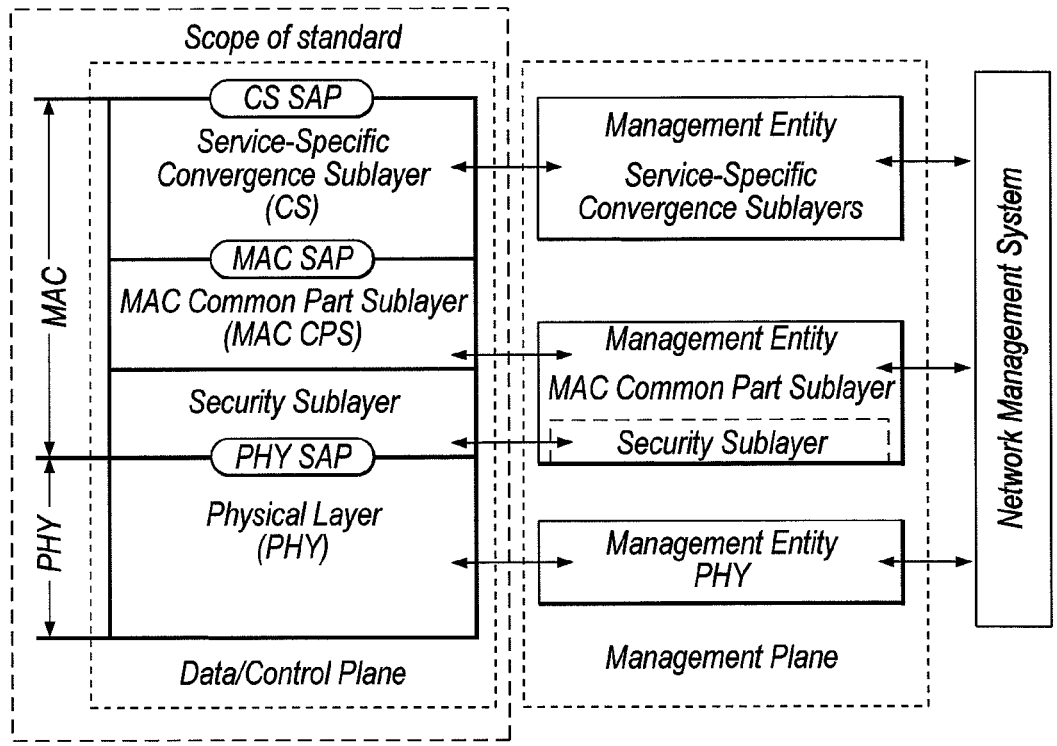
FIG. 1 shows protocol layering in accordance with IEEE 802.16.
Figure 2:
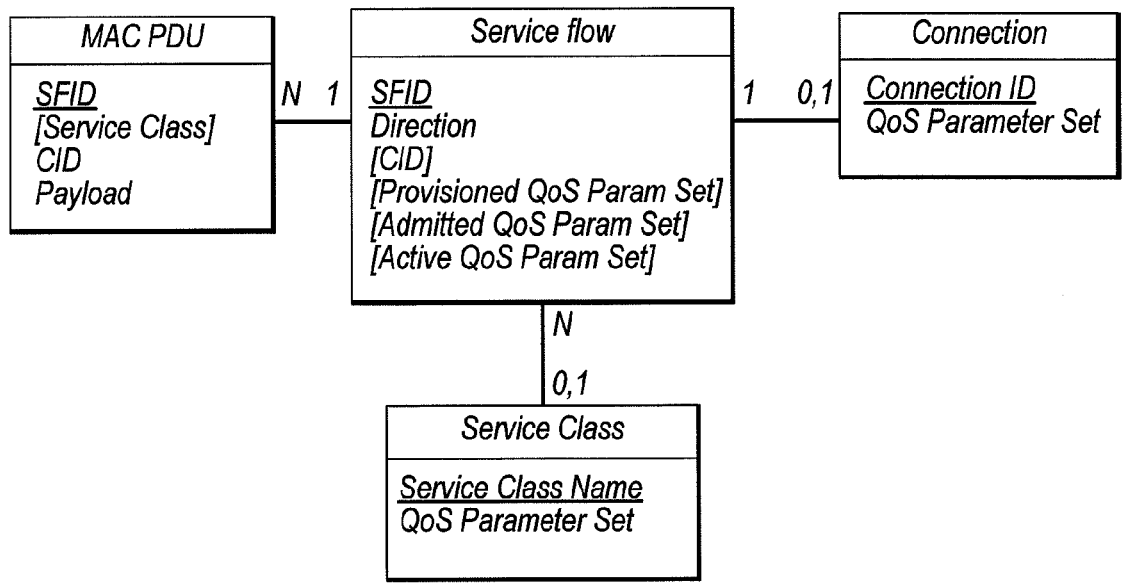
FIG. 2 shows the relationship between CID, SFID and QoS in an IEEE 802.16 network.
Figure 3:
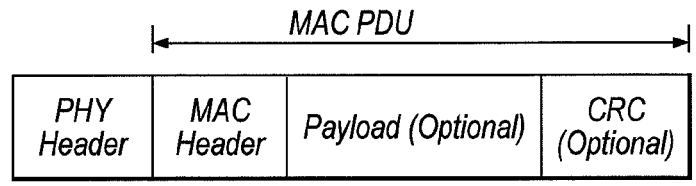
FIG. 3 shows a packet format capable of being used in an IEEE 802.16 network.
Figure 4:
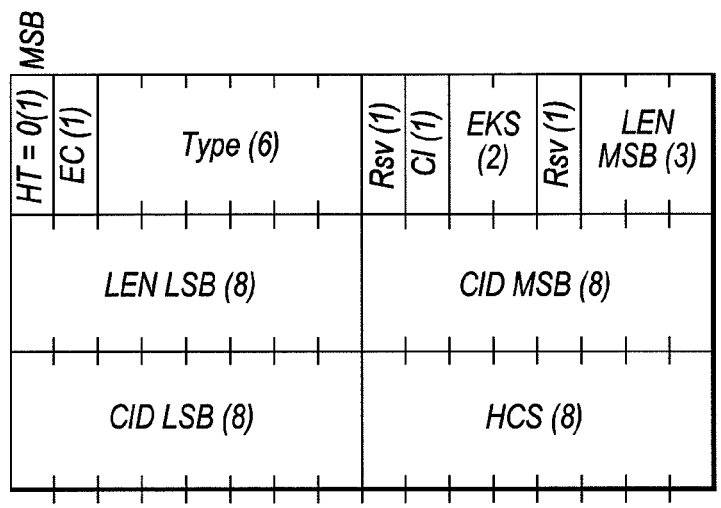
FIG. 4 shows a generic MAC header of a packet as set forth in the IEEE 802.16 specification.
Figure 5:
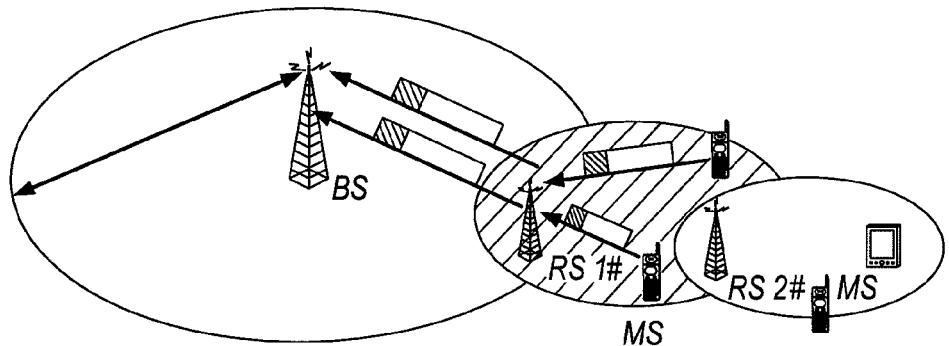
FIG. 5 illustrates a simple relay protocol in a multi-hop wireless communication system.
Figure 6:
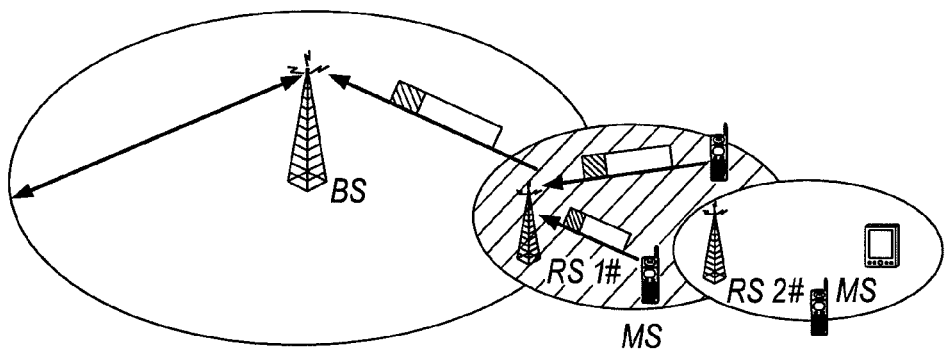
FIG. 6 illustrates the relay protocol employed in a particular embodiment of the present invention.

An embodiment of the present invention will now be described with reference to FIGS. 6-11, using an IEEE 802.16 network as an example. In this embodiment, an algorithm is proposed by which the RS can combine the packets received from the communication devices connected to itself, forming one or more new packets (combined packets), and send the combined packets to the BS (or to an upstream RS), thus decreasing the overhead and collision of packet transmission. This relay protocol is schematically shown in FIG. 6. There are various possible ways of combining received packets, as will now be explained.

1. Operations in RS

Figure 7:
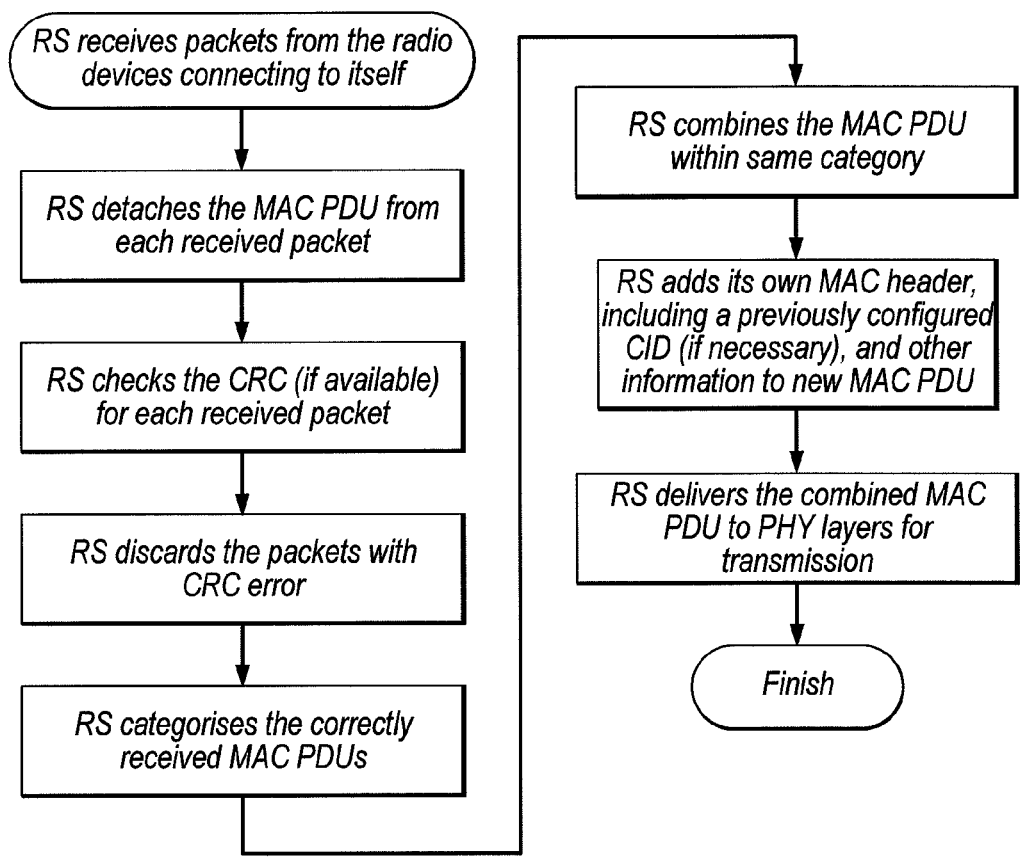
FIG. 7 is a flowchart of processing in an relay station to combine MAC PDUs.

Referring to FIG. 7, the following operations take place on the RS side after the RS receives multiple packets from the connected radio devices.

(i) RS detaches the MAC PDUs from the packets received. If the CRC is available in a MAC PDU, then RS will check the CRC and discard the MAC PDUs with CRC error.

(ii) In terms of the types or the QoS level of the received MAC PDUs, the RS then categorizes the correctly received MAC PDUs. The purpose of this step is to further decrease the overhead by combining MAC PDUs, and to make the QoS management convenient in RS. For example, the received packets may include bandwidth requests; the RS can group the bandwidth requests and then send one bandwidth-request MAC PDU to BS as an aggregation bandwidth request for all received requests. RS also can group MAC PDUs with same latency requirement (QoS), and then it can decide when to send the grouped PDUs. Since an RS can also combine all the received MAC PDUs without considering their types, this step is optional.

Figure 8:
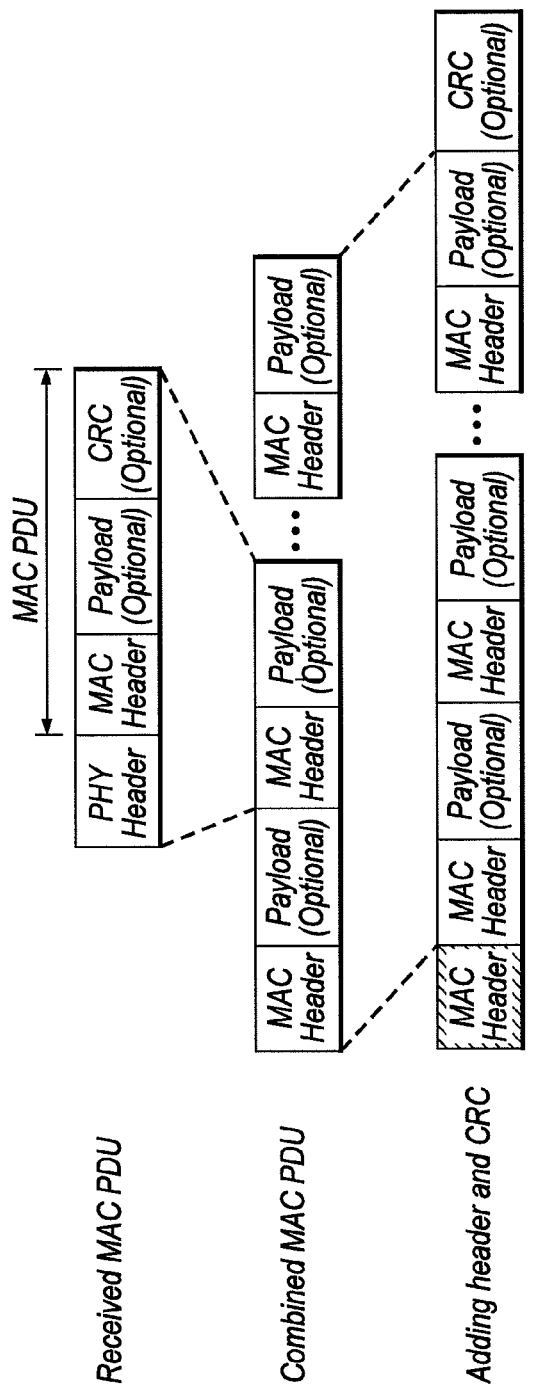
FIG. 8 shows a first method of combining MAC PDUs.
Figure 9:
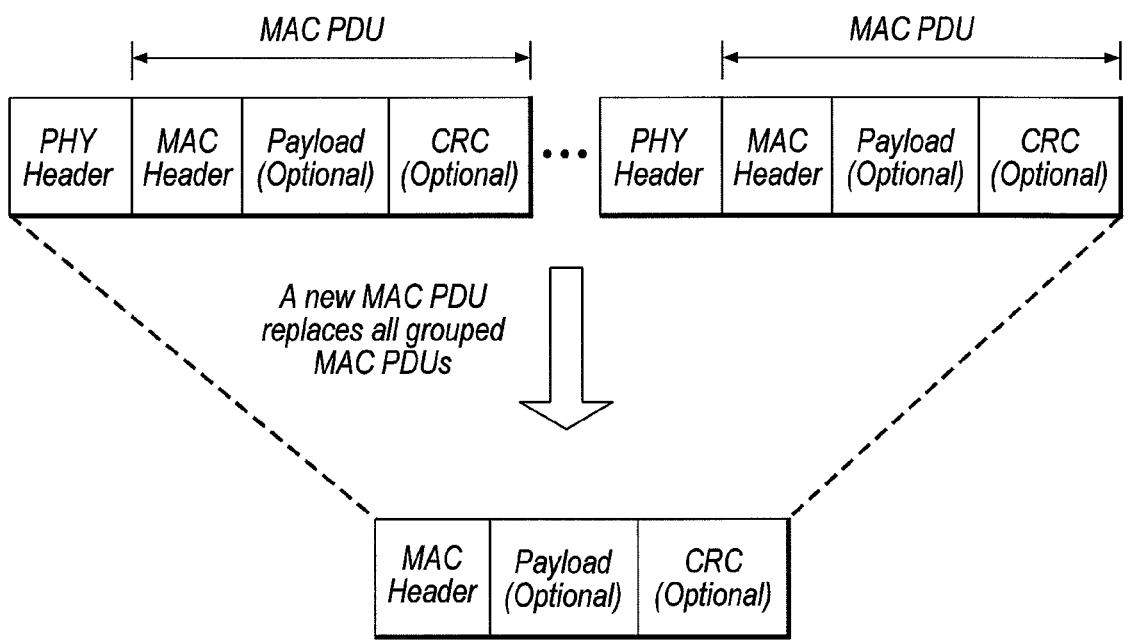
FIG. 9 shows a second method of combining MAC PDUs.
Figure 10:
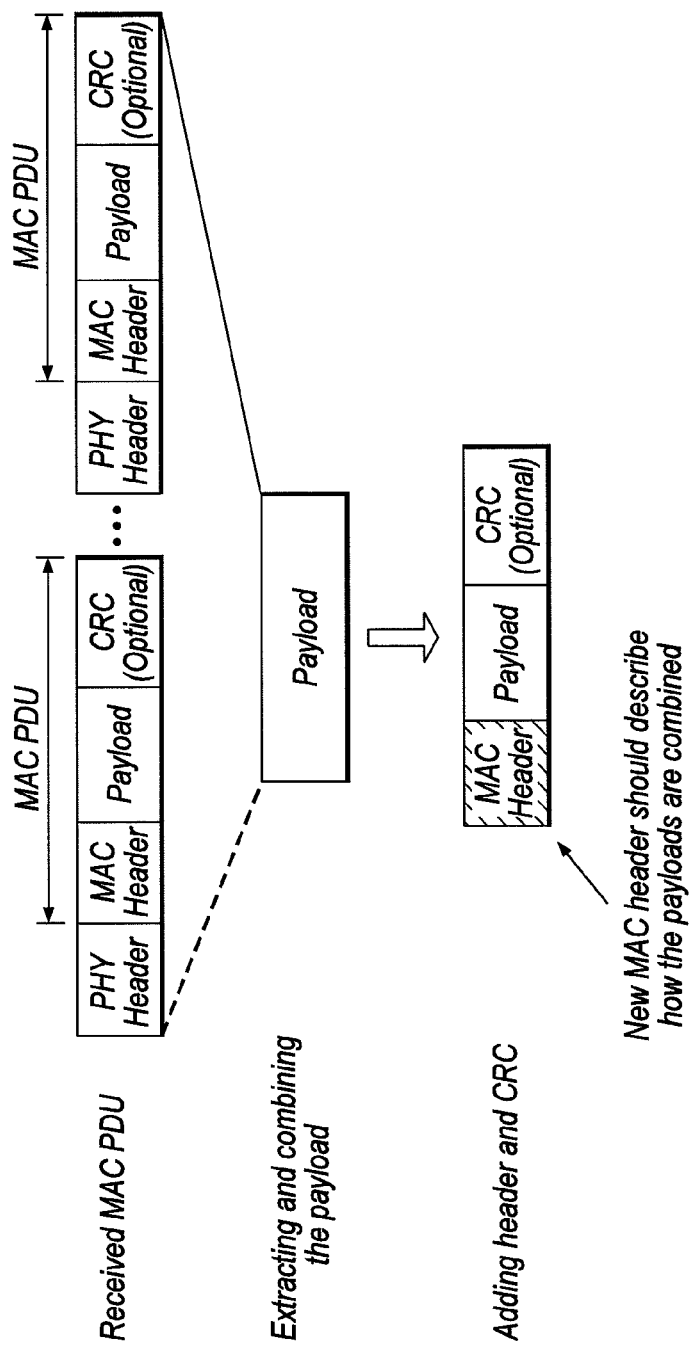
FIG. 10 shows a third method of combining MAC PDUs.

(iii) The RS combines the MAC PDUs within same category, and then adds its MAC header and CRC into the combined MAC PDU. One combination method is firstly removing CRC sequences in the received MAC PDUs, and then linking the individual MAC PDUs, as shown in FIG. 8. Another method is using a new MAC PDU to replace the grouped MAC PDUs, as illustrated in FIG. 9. For example, in an OFDMA wireless system, RS may use one bandwidth request to apply for bandwidth for a group of devices. Another method is firstly extracting the payload from the received MAC PDUs, and then combining these payloads in a new MAC PDU, as depicted in FIG. 10. In this case, the new MAC header should describe how to combine the payloads. In all above methods, if necessary, a previously configured CID, identifying the connection between RS and BS, and other information will be added into the new MAC PDU.

(iv) Finally, the RS delivers the MAC PDU to PHY layer to add PHY header and other information, and transmit this MAC PDU.

2. Operations in BS

Figure 11:
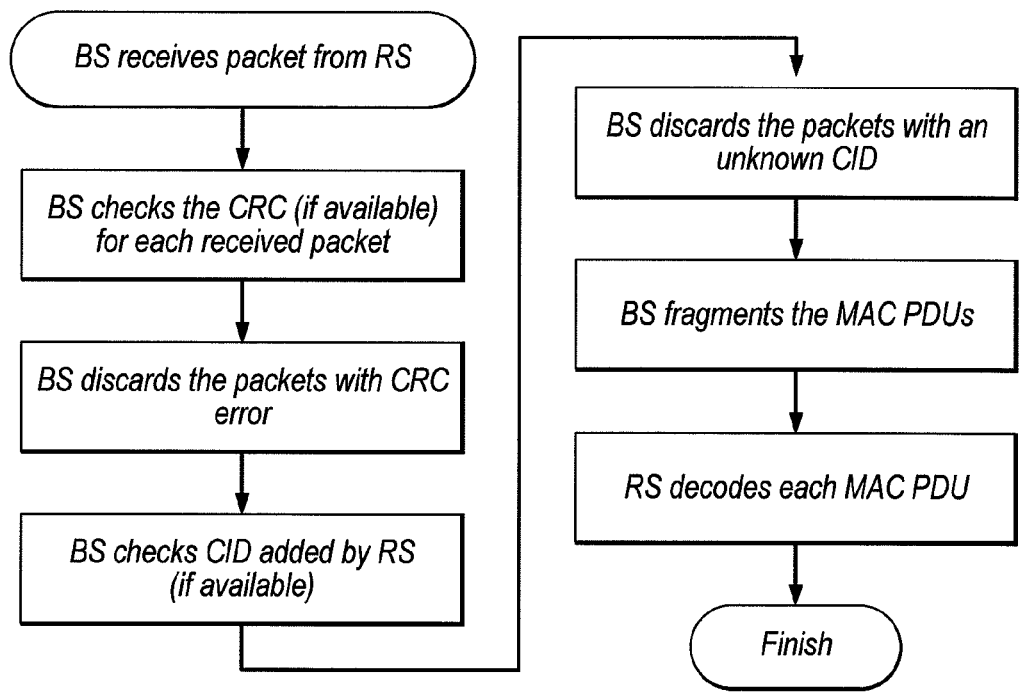
FIG. 11 is a flowchart of processing in a base station.

Referring to FIG. 11, the following operations take place on the BS side after the BS receives the new packet having the combined MAC PDU from the RS:

(i) BS checks the CRC (if available) for the received packet from RS. BS will discard the packets with CRC error;

(ii) BS checks the CID (if available) for the received packet from RS. BS will discard the packet with unknown CID;

(iii) BS decodes the MAC PDU, or fragments the linked MAC PDUs if present (FIG. 8) and decodes them.

Although the above description concerns the processing in a single RS and BS, other RSs may be present in the network. In this case, in relation to each other RS, the first RS may act like the BS in the above explanation. Each other RS will serve its own set of SSs and combine the packets received from those SSs in the same manner as explained above for the first RS.

Particular embodiments of the present invention may provide one or more of the following effects:

Define a protocol for an RS to process the received packets.

Minimize the PHY overhead by classifying and combining received packets in RS.

Decreases the collision probability for the contention style packets between RS and BS.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the RS or BS in embodiments of the present invention. It is also possible to provide each SS with some or all of the functionality of the RS. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A wireless communication method in a system in which subscriber stations are each operable for communication with a base station, the base station being capable of performing simultaneous communications with a plurality of the subscriber stations simultaneously by exchange of packets each conforming with a layered protocol of said system, the packets comprising a first portion for defining physical layer (PHY) parameters and a second portion for defining media access layer (MAC) parameters, and communications between the subscriber stations and the base station being performed wholly or partly through at least one relay station, the method comprising steps of, in the relay station:

receiving a plurality of packets from the subscriber stations;

detecting the second portion of each of the packets;

combining the detected second portions to form a second portion of at least one new packet; and transmitting the new packet to the base station, wherein:

the second portion of each packet includes error-checking information, and said detecting step comprises checking the error-checking information of packets received from the subscriber stations and discarding any packets thereby found to have been incorrectly received; and the combining comprises removing the error-checking information from the second portion of each received packet and linking the remainder of each second portion to form the second portion of the new packet.

2. A wireless communication system in which subscriber stations are each operable for communication with a base station, the base station being capable of performing simultaneous communications with a plurality of the subscriber stations simultaneously by exchange of packets each conforming with a layered protocol of said system, the packets comprising a first portion for defining physical layer (PHY) parameters and a second portion for defining media access layer (MAC) parameters, and communications between the subscriber stations and the base station being performed wholly or partly through at least one relay station, wherein the relay station comprises:

a receiver arranged to receive a plurality of packets from the subscriber stations;

a detector arranged to detect the second portion of each of the packets;

a processor arranged to combine the detected second portions to form a second portion of at least one new packet; and a transmitter for transmitting the new packet to the base station, wherein:

the second portion of each packet includes error-checking information, and said detector is arranged to check the error-checking information of packets received from the subscriber stations and discard any packets thereby found to have been incorrectly received; and the processor is arranged to remove the error-checking information from the second portion of each received packet and link the remainder of each second portion to form the second portion of the new packet.

3. A relay station for use in a wireless communication method in a system in which subscriber stations are each operable for communication with a base station, the base station being capable of performing simultaneous communications with a plurality of the subscriber stations simultaneously by exchange of packets each conforming with a layered protocol of said system, the packets comprising a first portion for defining physical layer (PHY) parameters and a second portion for defining media access layer (MAC) parameters, and communications between the subscriber stations and the base station being performed wholly or partly through the relay station, the relay station comprising:

a receiver for receiving a plurality of packets from the subscriber stations;

a detector for detecting the second portion of each of the packets;

a processor for combining the detected second portions to form a second portion of at least one new packet; and a transmitter for transmitting the new packet to the base station, wherein:

the second portion of each packet includes error-checking information, and said detector is arranged to check the error-checking information of packets received from the subscriber stations and discard any packets thereby found to have been incorrectly received, and the processor is arranged to remove the error-checking information from the second portion of each received packet and link the remainder of each second portion to form the second portion of the new packet.

4. A base station for use in a wireless communication method in a system in which subscriber stations are each operable for communication with the base station, the base station being capable of performing simultaneous communications with a plurality of the subscriber stations simultaneously by exchange of packets each conforming with a layered protocol of said system, the packets comprising a first portion for defining physical layer (PHY) parameters and a second portion for defining media access layer (MAC) parameters, and communications between the subscriber stations and the base station being performed wholly or partly through at least one relay station which receives a plurality of packets from the subscriber stations, detects the second portion of each of the packets, combines the detected second portions to form a second portion of at least one new packet, and transmits the new packet to the base station; wherein the base station comprises:

a receiver for receiving the or each new packet sent from the relay station; and a decoder for decoding the second portion of the new packet, wherein the second portion of each packet includes error-checking information, and said decoder includes means for checking the error-checking information of the or each new packet sent from the relay station, and discarding any packet found to have been incorrectly received.

5. The base station according to claim 4, wherein the second portion of every packet contains a connection ID identifying an active connection in the system, and the base station monitors connection IDs of its own active connections.

6. The base station according to claim 5, wherein said decoder checks the connection IDs of received packets and discards any packet having an unknown connection ID.

7. The base station according to claim 1, wherein the new packet sent from the relay station includes linked second portions of the packets received from the plurality of subscriber station, and the decoder is arranged to fragment said linked second portions.

* * * * *

UNITED STATES PATENT AND TRADEMARK OFFICE
CERTIFICATE OF CORRECTION

| | | |
|---|---|---|
| PATENT NO. | : 8,923,187 B2 | Page 1 of 1 |
| APPLICATION NO. | : 13/099513 | |
| DATED | : December 30, 2014 | |
| INVENTOR(S) | : Michael John Beems Hart | |

It is certified that error appears in the above-identified patent and that said Letters Patent is hereby corrected as shown below:

In the claims:

Col. 8, Ln. 21: After "The base station according to claim" and before "wherein the new" delete "1," and insert -- 4, --.

Signed and Sealed this
Seventh Day of April, 2015

Michelle K. Lee
*Director of the United States Patent and Trademark Office*